(12) United States Patent
Badano et al.

(10) Patent No.: US 11,119,251 B2
(45) Date of Patent: Sep. 14, 2021

(54) LENS WITH FOCUSING METASURFACE AND LOW CHROMATIC ABERRATION

(71) Applicant: COMMISSARIAT A L'ENERGIE ATOMIQUE ET AUX ENERGIES ALTERNATIVES, Paris (FR)

(72) Inventors: Giacomo Badano, Lans en Vercors (FR); Johan Rothman, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 257 days.

(21) Appl. No.: 16/477,359

(22) PCT Filed: Jan. 11, 2018

(86) PCT No.: PCT/FR2018/050061
§ 371 (c)(1),
(2) Date: Jul. 11, 2019

(87) PCT Pub. No.: WO2018/130786
PCT Pub. Date: Jul. 19, 2018

(65) Prior Publication Data
US 2019/0383969 A1  Dec. 19, 2019

(30) Foreign Application Priority Data
Jan. 13, 2017  (FR) ..................... 1750289

(51) Int. Cl.
*G02B 1/00* (2006.01)
*G02B 27/00* (2006.01)

(52) U.S. Cl.
CPC ........... *G02B 1/002* (2013.01); *G02B 27/005* (2013.01)

(58) Field of Classification Search
CPC .............................. G02B 1/002; G02B 27/005
See application file for complete search history.

(56) References Cited

U.S. PATENT DOCUMENTS

2010/0054105 A1* 3/2010 Handa ................... B82Y 20/00
369/112.01
2016/0259175 A1* 9/2016 Ellenbogen .............. G02B 5/30

OTHER PUBLICATIONS

International Search Report dated Mar. 20, 2018 in PCT/FR2018/050061 filed on Jan. 11, 2018.
French Preliminary Search Report dated Oct. 26, 2017 in French Application 1750289 filed on Jan. 13, 2017.
Mendoza, B. S. et al., "Tailored Optical Polarization in Nano-Structured Metamaterials," arXiv:1604.00701v1, Physics Optics, Apr. 3, 2016, pp. 1-14, XP080693043.
(Continued)

*Primary Examiner* — Robert E. Tallman
(74) *Attorney, Agent, or Firm* — Oblon, McClelland, Maier & Neustadt, L.L.P.

(57) ABSTRACT

The invention relates to a metasurface lens using a planar array of elementary resonators, each elementary resonator being the shape of a cross the arms of which are of unequal length. The phase shift applied by an elementary resonator is dependent on its orientation in the plane of the lens, the orientation of the various elementary resonators being determined depending on the shape of the desired wavefront. Such a lens has a substantially uniform transmission-coefficient distribution and a low chromatic aberration. Furthermore, it has a very good spectral selectivity.

13 Claims, 7 Drawing Sheets

(56) References Cited

OTHER PUBLICATIONS

Imhof, C. et al., "Strong birefringence in left-handed metallic metamaterials," Elsevier, ScienceDirect, Optics Communications, vol. 280, 2007, pp. 213-216, XP22298030.
Al-Nuaimi, M. K. T. et al., "Design of High-Directivity Compact-Size Conical Horn Lens Antenna," IEEE Antennas and Wireless Propagation Letters, vol. 13, 2014, pp. 467-470, XP11543465.
Lin, L. et al., "Resonant nanometric cross-shaped apertures: Single apertures versus periodic arrays," American Institute of Physics, Applied Physics Letters, vol. 95, No. 201116, 2009, XP12126482 (total 3 pages).
Yu, N. et al., "Flat optics with designer metasurfaces," Nature Materials, vol. 13, Feb. 2014, pp. 139-150.
Goh, X. M. et al., "Plasmonic lenses for wavefront control applications using two-dimensional nanometric cross-shaped aperture arrays," Journal of Optical Society of America B, vol. 28, No. 3, Mar. 2011, pp. 547-553.
Cortie, M.B. et al, "Plasmon resonance and electric field amplification of crossed gold nanorods," Elsevier, ScienceDirect, Photonics and Nanostructures—Fundamentals and Applications, vol. 7, 2009, pp. 143-152, XP26704330.
U.S. Appl. No. 15/491,538, filed Apr. 19, 2017, US 2017/0309663 A1, Johan Rothman.
U.S. Appl. No. 15/643,930, filed Jul. 7, 2017, US 2018/0013030 A1, Johan Rothman.
U.S. Appl. No. 15/777,698, filed May 21, 2018, US 2018/0337210 A1, Johan Rothman.
U.S. Appl. No. 15/777,722, filed May 21, 2018, US 2018/0374881 A1, Johan Rothman, et al.

\* cited by examiner

LENS WITH FOCUSING METASURFACE AND LOW CHROMATIC ABERRATION

TECHNICAL FIELD

The object of the present invention relates to flat lenses with a metasurface, in particular with a focusing metasurface. The present invention can in particular be applied to spectral sorting.

Prior Art

Conventional optical lenses use the properties of refraction of the materials that compose them in order to modify the wavefronts and control the optical paths of the beams that pass through them.

These optical lenses are generally thick, in particular for short focal distances. In order to obtain smaller thicknesses, it is well known to use Fresnel lenses. In practice, Fresnel lenses are created by numerous levels of lithography in such a way as to make discrete the variation in thickness of dielectric necessary in order to obtain the desired wavefront shape at the output. Moreover, Fresnel lenses do not have spectral selectivity.

Lenses with metasurfaces allow to carry out a continuous phase variation with good spectral selectivity while having a small thickness. These lenses with metasurfaces generally use arrays of elementary optical resonators (also called optical antennas) with a density substantially less than the incident wavelength of interest. The shape, the size and the orientation of these optical antennas are chosen in order to obtain the desired wavefront shape.

In general, creating flat lenses with a metasurface is known. A metasurface is a surface structured to create an array of resonators, the dimensions and the pitch of which are less than the wavelength. Sub-wavelength resonators are generally obtained by lithography starting from a metal or dielectric layer deposited on a substrate. The phase and the amplitude of the light wave reemitted by each elementary sub-wavelength resonator are dependent on its geometry, on its orientation with respect to the polarisation of the incident wave and on the materials that constitute it. This wave can be considered to be a spherical wave affected by a phase delay with respect to the incident wave.

A general introduction to lenses with a metasurface can be found in the article by N. Yu et al. entitled "Flat optics with designer metasurfaces" published in Nature Materials, Vol. 13, February 2014, pp. 139-150.

An example of a convergent lens with a metasurface has been proposed in the article by X. M. Goh et al. entitled "Plasmonic lenses for wavefront control applications using two-dimensional nanometric cross-shaped aperture arrays" published in J. Opt. Soc. Am. B, Vol. 28, No. 3, March 2011, pp. 547-553. This lens is formed by a periodic array of crosses having a variable size (size decreasing from the centre to the periphery for a convergent lens and increasing from the centre to the periphery for a divergent lens). However, while this lens structure is simple, it has a major disadvantage in that it is not possible to independently control the phase and the rule for transmission in terms of wavelength (in particular, the transmission coefficient in terms of wavelength). This results in an apodisation of the pupil at a determined wavelength. Moreover, this type of lens has high chromatic aberration. In other words, the focal distance of this type of lens varies substantially with the wavelength. Finally, this type of lens has low spectral selectivity.

The object of the present invention is consequently to propose lenses with a metasurface only having low chromatic aberration in a predetermined spectral band, while guaranteeing a uniform distribution of the transmission coefficient for a given wavelength, as well as better spectral selectivity.

DISCLOSURE OF THE INVENTION

The present invention is defined by a lens with a metasurface intended to receive an incident wave of a given wavelength, comprising at least one first array of resonators, located in a plane of the lens, said resonators of the first array being crosses having identical shapes, each cross comprising at least a first arm, called long arm, extending along a first axis and a second arm, called short arm, having a length strictly less than the long arm and extending along a second axis, substantially orthogonal to the first axis, each cross phase shifting the incident wave by introducing a specific phase shift depending on the orientation of the cross with respect to a reference direction in the plane of the lens, the crosses of the first array not having a unique orientation.

The length of the long arm is typically greater than the length of the short arm by 5% to 10%.

Advantageously, the lengths of the long and short arm are chosen in such a way that the difference between the resonance frequency of the long arm and the resonance frequency of the short arm is less than the width at half height of the transmission spectral response of each of said arms.

Preferably, the crosses are made by apertures in a metal layer, the metal layer being deposited on a first dielectric layer transparent to said given wavelength.

Moreover, these apertures can be filled by a material having an optical index greater than the optical index of the first dielectric layer.

The first dielectric layer can itself be deposited on a semiconductor substrate transparent to said given wavelength, the optical index of the substrate being greater than the index of the first dielectric layer.

Moreover, a second dielectric layer can be deposited on the metal layer, said second dielectric layer being made from the same material as the first dielectric layer and having a thickness of $$\frac{\lambda}{2n}$$

where $\lambda$ is said given wavelength and n is the index of the first and second dielectric layer.

According to a first embodiment, the lens with a metasurface is a convergent lens, having a focal distance f and the orientation of a cross, the centre of which is located at a point p, having the coordinates $(x_i, y_i)$ in a reference frame (O, x, y) in the plane of the lens, is chosen in such a way as to generate a specific phase shift $$\varphi_i = \frac{2\pi n_o}{\lambda}\left(f - \sqrt{x_i^2 + y_i^2 + f^2}\right) \text{ with } |\varphi_i| < \frac{\pi}{2}$$

where $\lambda$ is said given wavelength and $n_o$ is the index of the output medium of the lens.

According to a second embodiment, the lens with a metasurface is a convergent lens, having a focal distance f and the orientation of a cross, the centre of which is located at a point p, having the coordinates $(x_i, y_i)$ in a reference frame (O, x, y) in the plane of the lens, is chosen in such a way as to generate a specific phase shift $$\varphi_i = \phi_i \mod \frac{\pi}{2} \text{ with } \phi_i = \frac{2\pi n_o}{\lambda}\left(f - \sqrt{x_i^2 + y_i^2 + f^2}\right),$$

where $n_o$ is the index of the output medium of the lens, a third dielectric layer having a thickness of $$\frac{\lambda}{2n}$$

being deposited only above the crosses for which $$\frac{\pi}{2} < |\phi_i| < \pi.$$

According to an alternative, the orientation of the crosses can only take on a finite set of discrete angular values.

The first array can be chosen to be periodic.

According to an alternative of the first embodiment, the lens with a metasurface comprises a second array of resonators located in the plane of the lens, the resonators of the second array being crosses having identical shapes, each cross of the second array being further located in an effective section having a size of $$\left(\frac{\lambda}{2}\right)^2$$

of a cross of the first array, the crosses of the second array having a size smaller than that of the crosses of the first array, each cross of the second array also comprising a long arm and a short arm, each cross of the second array phase shifting the incident wave by a specific phase shift depending on its orientation, in the second plane of the lens, with respect to said reference direction.

According to an example of use, the incident wave comprises a first spectral component at a first wavelength $\lambda_1$ and a second spectral component at a second wavelength $\lambda_2$. The lens with a metasurface can be a convergent lens, having a focal distance f, the orientation of a cross of the first array, the centre of which is located at a point $P_i$ having the coordinates $(x_i, y_i)$ in a reference frame (O, x, y) of the plane of the lens, being chosen in such a way as to generate a specific phase shift $$\varphi_{1,i} = \frac{2\pi n_o^1}{\lambda_1}\left(f - \sqrt{(x_i - x_1)^2 + (y_i - y_1)^2 + f^2}\right) \text{ with } |\varphi_{1,i}| < \frac{\pi}{2}$$

where $n_o^1$ is the optical index of the output medium of the lens, at the wavelength $\lambda_1$, and the orientation of a cross of the second array, the centre of which is at a point $P_j$ having the coordinates $(x_j, y_j)$ in the reference frame (O, x, y), being chosen in such a way as to generate a specific phase shift $$\varphi_{2,j} = \frac{2\pi n_o^2}{\lambda_2}\left(f - \sqrt{(x_j - x_2)^2 + (y_j - y_2)^2 + f^2}\right) \text{ with } |\varphi_{2,j}| < \frac{\pi}{2}$$

where $n_o^2$ is the optical index of the output medium of the lens, at the wavelength $\lambda_2$.

BRIEF DESCRIPTION OF THE DRAWINGS

Other features and advantages of the invention will be clear upon reading a preferred embodiment of the invention, while referring to the appended drawings among which.

DETAILED DISCLOSURE OF SPECIFIC EMBODIMENTS

The idea on which the present invention is based is to create a lens with a metasurface from a two-dimensional array of resonators, the resonators being crosses having identical shapes, comprising two orthogonal arms having unequal lengths, each cross introducing a phase shift that is specific to it according to its orientation with respect to a reference direction. Using crosses having identical shapes but variable orientation allows to locally adjust the phase shift applied to the incident wave while guaranteeing a substantially uniform distribution of the transmission coefficient in the plane of the lens. The orientations of the various crosses are chosen in such a way as to obtain the desired wavefront shape, with it being understood that since the object of the invention is a lens, the set of crosses does not have one single orientation (in other words, at least two crosses of said set have different orientations). Finally, using crosses having arms with unequal lengths with a relatively small relative difference (from 5 to 15%), as will be shown below, allows to reduce the chromatic aberrations in the spectral band of interest.

Figure 1:
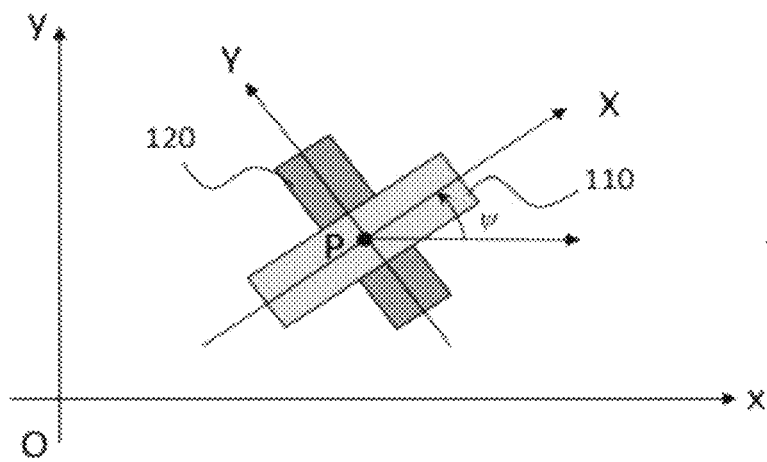
FIG. 1 schematically shows the geometry of a sub-wavelength resonator used in a lens with a metasurface according to the invention.

FIG. 1 schematically shows the geometry of a sub-wavelength resonator in the shape of a cross having unequal arm lengths, as used in a lens with a metasurface according to the present invention.

The sub-wavelength resonator illustrated in FIG. 1 constitutes the elementary pattern of the array used in the lens with a metasurface. This resonator comprises a first arm, called long arm, 110, extending in a first direction OX and a second arm, called short arm, 120, extending in a second direction OY, substantially orthogonal to the first direction. The short and long arm intersect at their respective middles. The relative difference in length between the long and short arm is advantageously between 5% and 15%, preferably between 5% and 10%.

The orientation of the cross (in the plane Oxy) conventionally designates the angle ψ that the long arm makes, that is to say the axis OX, with a reference direction, for example the axis Ox. It is understood that, given its axial symmetry, the orientation of the cross is comprised in an angular range having a width of π.

Figure 2A:
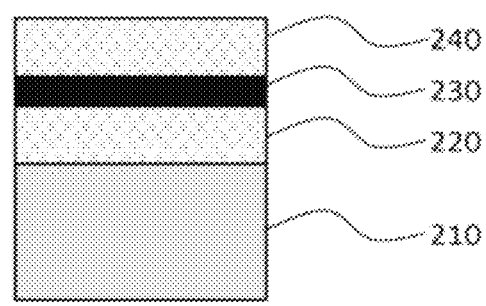
FIG. 2A schematically shows the structure of a lens with a metasurface according to a first embodiment of the invention.

FIG. 2A schematically shows the structure, viewed cross-sectionally, of a lens with a metasurface according to a first embodiment of the invention.

The lens with a metasurface is made from a substrate 210, for example a substrate made of a semiconductor material such as Si, CdHgTe, GaAs, GaAlAs, etc., transparent for the wavelength of interest. The optical index of the material (at this wavelength) is chosen to be high, for example equal to 3.5 The substrate represents the output pupil of the lens.

The substrate, 210, is covered by a first layer of dielectric having a low index, 220, that is to say having an optical index substantially lower than that of the substrate. In general, the thickness of the first dielectric layer is chosen as equal to $$\frac{\lambda}{2n}$$

where n is the optical index of the material of the first dielectric layer.

The thickness of the first dielectric layer is for example 100 to 200 nm. $SiO_2$ can be used in the wavelength range 2-9 μm and ZnS ca be used beyond that. Below 2 μm, $SiO_x$ can be used by choosing its stoichiometry, or another oxide can be used such as ITO for example.

The sub-wavelength resonators are made via a metal layer, 230, deposited on the first dielectric layer. The metal layer is 50 to 300 nm thick and consists of a metal with very good conductivity, such as Cu, Au, Al or Ag. The thickness of the layer is determined according to the desired spectral selectivity of the lens, a thick layer leading to a narrow resonance and thus a narrow bandwidth, a thin layer leading to a less marked resonance and thus a wider bandwidth.

This metal layer is structured as explained below.

The resonators are made by apertures in the metal layer, these apertures having the shape of a cross with unequal arms, as described in relation to FIG. 1. The apertures can then be filled with a dielectric material having an optical index greater than that of the first dielectric layer. For example, a dielectric material having an index of 2.2 can be chosen for a lens intended to operate in the mid-infrared. In certain uses, a material with a higher index can be chosen, for example Si having an index equal to 3.5. On the contrary, when the lens is intended to operate in the near-infrared, the apertures are left open, in other words, they are not filled by a dielectric material.

In the above examples, the metal layer can be structured by an etching method, for example focused ion beam etching or FIB (Focused Ion Beam) or by a method for deposition through a mask. In the first alternative, a Damascene process can be used to fill the apertures of the crosses via a dielectric material.

The structured metal layer 230 is advantageously covered by a second dielectric layer, 240, having the same index n as the first dielectric layer and having a thickness equal to $$\frac{\lambda}{2n}.$$

Thus, the structured metal layer is sandwiched between two dielectric layers having the same (low) index.

Figure 2B:
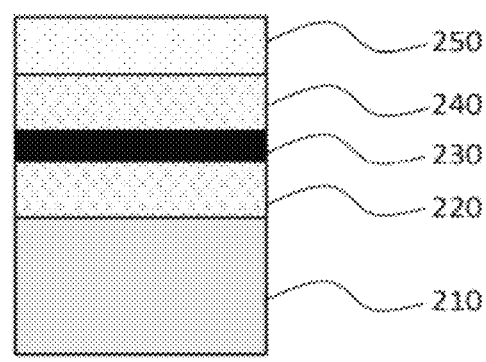
FIG. 2B schematically shows the structure of a lens with a metasurface according to a second embodiment of the invention.

FIG. 2B schematically shows the structure of a lens with a metasurface according to a second embodiment of the invention.

The structure of the lens with a metasurface according to the second embodiment differs from the structure of the first by the presence of a third layer of dielectric, 250, having the same index as the first and second layers of dielectric. This third layer of dielectric is structured, contrary to the first and second layer of dielectric. More precisely, as explained below, this layer having a thickness of $$\frac{\lambda}{2n}$$

is only present above certain resonators only in order to locally apply an additional phase shift by π to the incident wave.

The sub-wavelength resonators are arranged in the plane of the lens with a metasurface according to a two-dimensional arrays. This array can be a periodic array, for example a rectangular array, a hexagonal array or even a circular array. The array can be alternatively chosen to be pseudo-random. Preferably, an array will be chosen that allows to dispose the greatest number of resonators on the surface of the lens, in other words to obtain the greatest level of packing of the input pupil (problem called close packing problem, well known to a person skilled in the art). Here, the level of packing refers to the ratio:

$$\tau_{fill} = \frac{N\sigma}{S} \quad (1)$$

where S is the surface of the input pupil, N is the number of resonators and σ is the effective cross-section of the elementary resonator.

The choice of a high level of packing allows to obtain a high transmission coefficient and a better spatial resolution of the wavefront.

The respective orientations of the various resonators are chosen in such a way as to generate the desired wavefront.

More precisely, according to a first embodiment, if it is desired to create a convergent lens having a focal length f and if the coordinates of the phase centre of an elementary (sub-wavelength) resonator i in the plane of the lens are noted as $(x_i, y_i)$, its orientation $\psi_i$ is chosen in such a way as to create a phase shift of:

$$\varphi_i = \frac{2\pi n_o}{\lambda}\left(f - \sqrt{x_i^2 + y_i^2 + f^2}\right) \text{ with } |\varphi_i| < \frac{\pi}{2}, \quad (2)$$

where $\lambda$ is the wavelength of the incident wave and $n_o$ is the index of the output medium of the lens, in this case, here, the index of the substrate. It should be noted that the sub-wavelength resonator can only apply a phase shift limited to a phase range having a width of $\pi$. In other words, the lenses according to the first embodiment have a relatively small digital aperture.

According to a second embodiment, in order to create a lens having a focal length f, the orientation of each elementary resonator is chosen in such a way as to create a phase shift:

$$\varphi_i = \phi_i \bmod \frac{\pi}{2} \text{ with} \quad (3\text{-}1)$$

$$\phi_i = \frac{2\pi n_o}{\lambda}\left(f - \sqrt{x_i^2 + y_i^2 + f^2}\right) \quad (3\text{-}2)$$

As indicated in relation to FIG. 2B, a third dielectric layer having a thickness of $$\frac{\lambda}{2n}$$

is deposited only above the resonators for which $$\frac{\pi}{2} < |\phi|_i < \pi.$$

This second embodiment allows to cover the totality of the phase-shift range $[0, 2\pi]$ and consequently to obtain a given focal distance.

In practice, in order to simply the realisation of the lens with a metasurface, it is possible to only authorise a finite set of discrete orientations of the elementary resonators.

Regardless of the embodiment, the transmission coefficient (or attenuation coefficient) of the lens is distributed in a substantially uniform manner over the input pupil. Indeed, the orientation of an elementary resonator, because of its cross-shaped structure, does not greatly affect the transmission coefficient for non-polarised light. Thus, the phenomenon of apodisation observed in the lenses with a metasurface of the prior art is absent here.

Figure 3A:
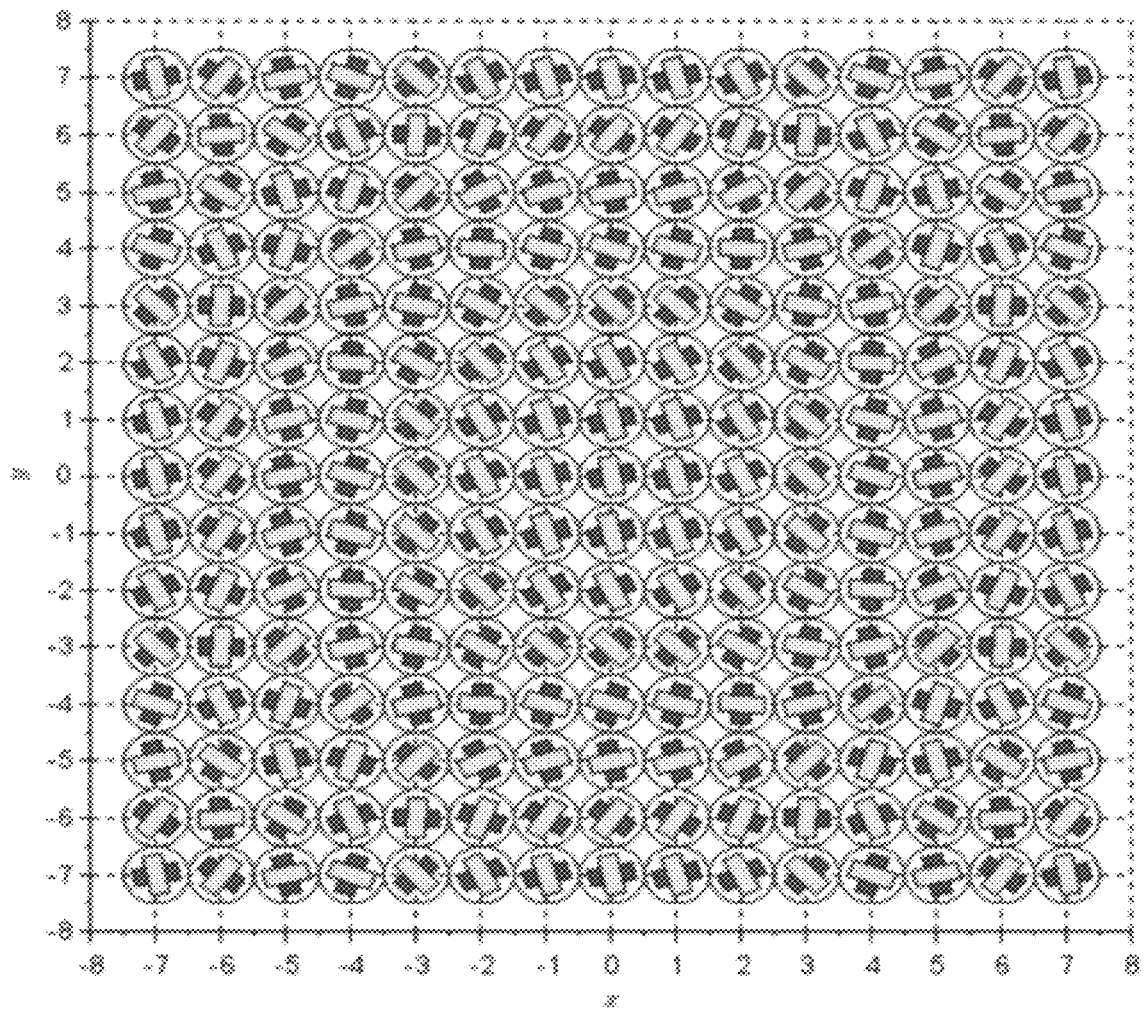
FIGS. 3A-3C schematically show, respectively a first, a second and a third example of a lens with a metasurface according to the invention.
Figure 3B:
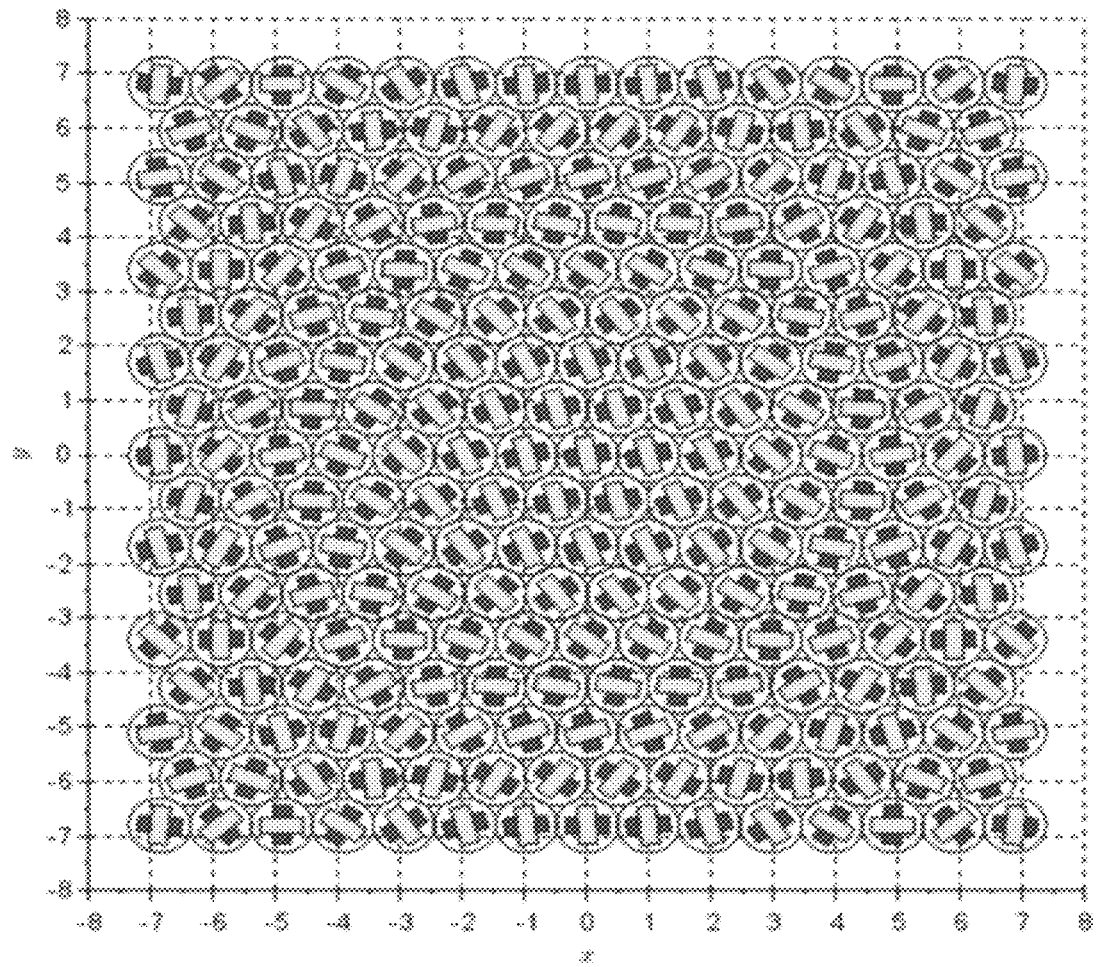
Figure 3C:
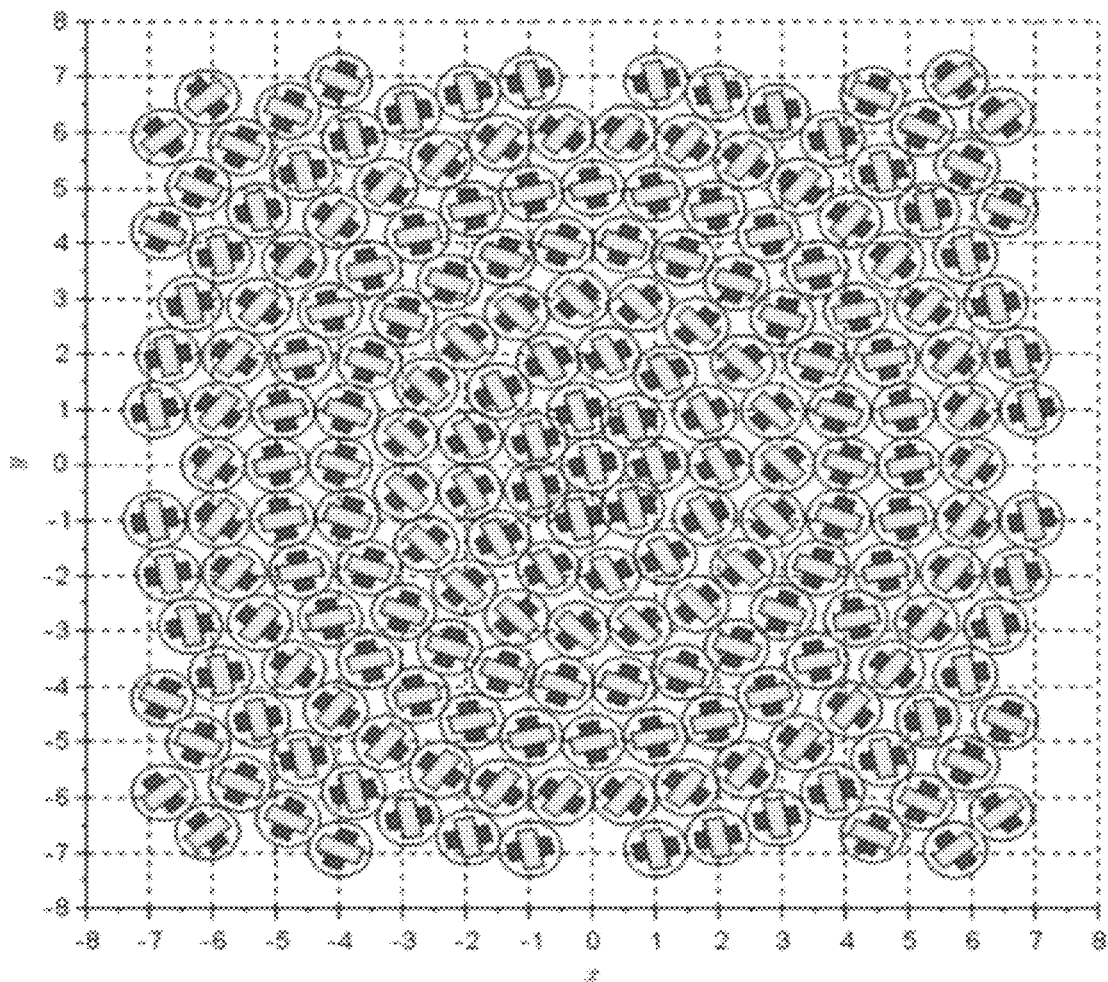

FIGS. 3A, 3B and 3C respectively show a first, a second and a third embodiment of a lens with a metasurface according to the invention.

These embodiments relate to a lens with a metasurface having a square cross-section. The sub-wavelength elementary resonators are formed by crosses having arms of unequal lengths, as described in relation to FIG. 1. The effective cross-sections of elementary resonators are represented by circles.

The two-dimensional arrangement of the resonators in the lens of FIG. 3A corresponds to a square array (the generator vectors of the array are directing vectors of the axes Ox and Oy). The two-dimensional arrangement of FIG. 3B corresponds to a hexagonal array (the generator vectors of the array form an angle of 30° between them). Finally, that of FIG. 3C corresponds to a circular array, the resonators being arranged in concentric circles. It should be noted that with a constant effective cross-section $\sigma$, the greatest level of packing is obtained here by a hexagonal array. It should also be noted that in the third example, the elementary resonators located at the same distance from the centre of the lens all have the same orientation, which is indeed coherent with the fact that they introduce the same phase-shift value.

The orientation of the elementary resonators can be obtained via a simulation.

According to a first variant, called semi-analytical variant, the object of this simulation is a single elementary resonator. More precisely, the geometric shape of the resonator, and in particular the relative difference in the lengths of its arms, is previously set, and the phase shift rule $\varphi = F(\psi)$ is determined by simulation according to the orientation $\psi$ of the resonator with respect to a reference axis. It is thus possible to calculate, on the basis of the position $(x_i, y_i)$ of any resonator, the phase shift $\varphi_i$ to be applied on the basis of the expressions (2) or (3-1), (3-2) and deduce therefrom the orientation of the resonator.

In practice, it is noted that two resonators having distinct orientations $\psi_1, \psi_2, 0 \leq \psi_1, \psi_2 < \pi$ lead to a relative phase shift $\varphi_1 - \varphi_2 = \psi_1 - \psi_2$. It is therefore easy to generate a desired phase distribution, to within a constant.

According to a second variant, the simulation is carried out on all of the elementary resonators of the lens. More precisely, the type of array and the geometric shape of the elementary resonator (in particular the relative difference in the lengths of its arms) are chosen previously. Then, the orientation of the various crosses is gradually optimised in order to maximise a merit function, for example the intensity of the diffracted wave at the desired focal point or the average of the intensity of the diffracted wave in the desired focal spot.

Although the examples given above relate to lenses that converge on a focal point, a person skilled in the art will understand that it is always possible, on the basis of a desired distribution of phase and of amplitude in the focal plane, to deduce, via an inverse Fourier transform, the distribution of amplitude and of phase required in the plane of the lens with a metasurface. The phase distribution can be obtained in a discretised manner via the phase shifts applied by the elementary resonators. It is thus possible to obtain a focal spot in the shape of a ring for example. As indicated above, since the object of the invention is a lens, the phase distribution cannot amount to a single phase shift and thus the orientations of the elementary resonators of the lens do not amount to a single orientation.

Figure 4:
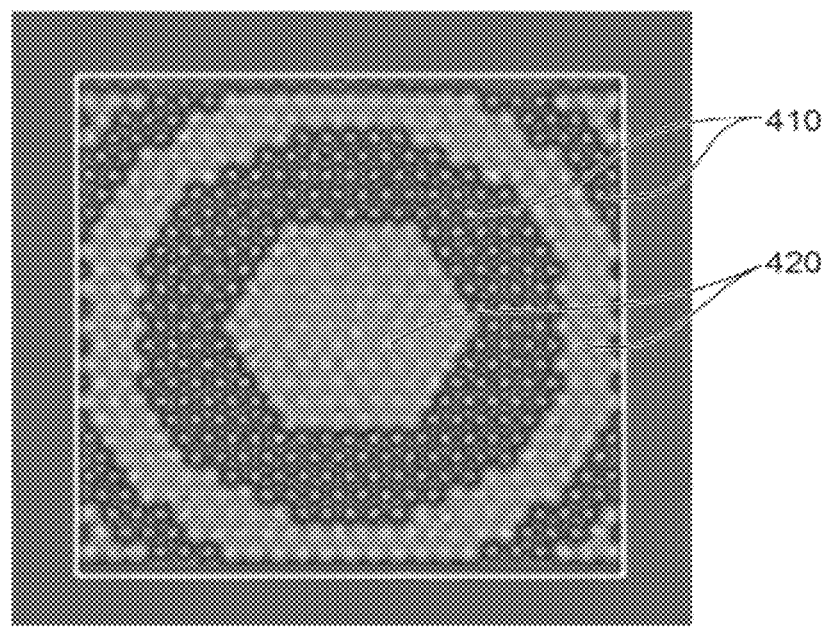
FIG. 4 schematically shows an example of a structured dielectric surface used in the second embodiment of the invention.

FIG. 4 schematically shows an example of a structured dielectric surface for a lens with a metasurface according to the second embodiment of the invention, using a circular array of elementary resonators.

410 shows the structured dielectric layer having a thickness of $$\frac{\lambda}{2n},$$

the layer being absent from the zones 420. As indicated above, the structured dielectric layer allows to locally introduce an additional phase shift of π when the phase shift $\phi_i$ to be applied exceeds π/2 in terms of absolute value.

An advantageous feature of the lenses with a metasurface according to the invention is to only have low chromatic aberration. Thus, for a convergent lens, the focal distance does not greatly depend on the wavelength in the bandwidth of the lens. To do this, the lengths of the arms are chosen to be different but relatively close to $$\frac{\lambda}{2n_s}$$

where $n_s$ is the optical index of the dielectric material in the crosses (that is to say filling the arms of the crosses). More precisely, it is recalled that the thickness of the metal layer gives the quality factor of the resonators and thus the width of the bandwidth of the lens. The relative difference in length of the arms is chosen in such a way that the corresponding difference in frequency (or in wavelength) is less than the width of this bandwidth. In other words, the difference between the resonance frequency of the long arm and of the resonance frequency of the short arm is chosen to be less than the width at half height of the transmission spectral response of said arms.

Figure 5:
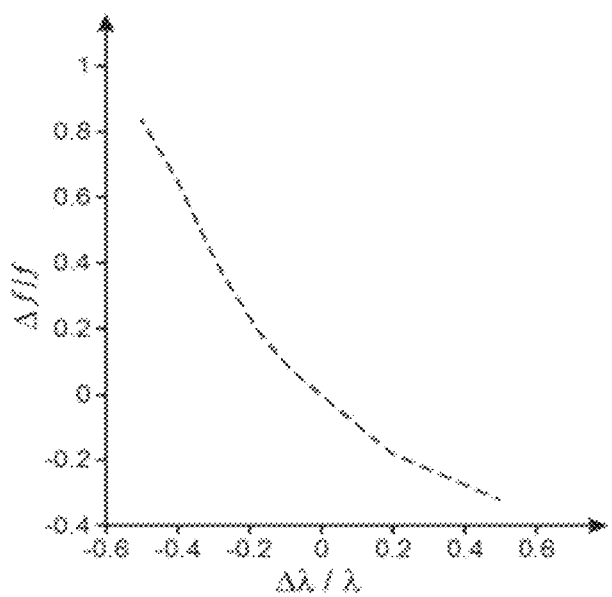
FIG. 5 shows the relative variation in the focal distance according to a relative variation in the incident wavelength, for an example of a lens with a metasurface according to the invention.

FIG. 5 shows the relative variation in the focal distance according to a relative variation in the incident wavelength, for an example of a lens with a metasurface according to the invention.

The abscissae represent the relative variation in wavelength and the ordinates represent the relative variation in focal distance.

Insofar as the focal distance is substantially greater than the wavelength (f☐λ), it is verified that a variation in wavelength only leads to a small variation in the focal distance.

It is supposed hereinafter that the incident wave comprises a first spectral component at the wavelength $\lambda_1$ and a second spectral component at the wavelength $\lambda_2$.

According to a variant of the first embodiment of the invention, the lens with a metasurface comprises a first array of sub-wavelength resonators at the wavelength $\lambda_1$ and a second array of sub-wavelength resonators at the wavelength $\lambda_2$. In other words, the elementary resonators of the first array are crosses, the arms of which have lengths that are unequal and close to $$\frac{\lambda_1}{2n}$$

and the elementary resonators of the second array are crosses, the arms of which have lengths that are unequal and close to $$\frac{\lambda_2}{2n}.$$

Figure 6:
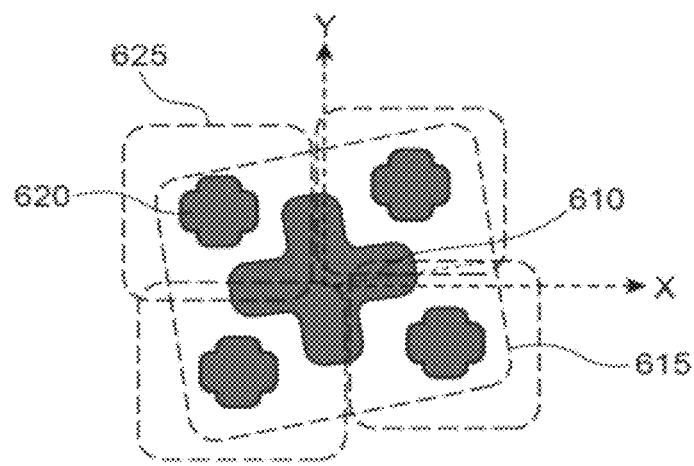
FIG. 6 schematically shows an arrangement of subwavelength resonators for a lens with a metasurface according to a variant of realisation of the invention.

FIG. 6 schematically shows an arrangement of sub-wavelength resonators for a lens with a metasurface according to this alternative.

611 represents an elementary resonator of the first array and 621-624 represent elementary resonators of the second array.

Since the effective cross-section of an elementary resonator is generally of the order $$\left(\frac{\lambda}{2}\right)^2$$

while the lengths of the arms are approximately $$\frac{\lambda}{2n},$$

it is possible to create a base pattern composed of elementary resonators of the first and second arrays in which the effective cross-section of each elementary resonator of the first array covered by the effective cross-section of the elementary resonators of the second array.

Thus, in FIG. 6, the effective cross-section 615 of the elementary resonator 610 is covered by the effective cross-sections 625 of the neighbouring elementary resonators 620.

The elementary resonators of the first and second array can thus be oriented in such a way that the component at the wavelength $\lambda_1$ converges at a first focal point $F_1$ and the component at the wavelength $\lambda_2$ converges at a second focal point $F_2$, distinct from $F_1$. It is supposed that the focal points are located at the same focal distance f but off centre with respect to the optical axis of the lens. The coordinates of $F_1$ and $F_2$ in the plane Π parallel to the plane of the lens respectively have the coordinates $(x_1, y_1)$ and $(x_2, y_2)$.

The orientation of an elementary resonator of the first array, the phase centre of which is located at a point $P_i$ having the coordinates $(x_i, y_i)$ in a reference frame $(O, x, y)$ of the plane of the lens, is chosen in such a way as to introduce a phase shift of $$\varphi_{1,i} = \frac{2\pi n_o^1}{\lambda_1}\left(f - \sqrt{(x_i - x_1)^2 + (y_i - y_1)^2 + f^2}\right) \text{ with } |\varphi_{1,i}| < \frac{\pi}{2}$$

where $n_o^1$ is the optical index of the output medium at the wavelength $\lambda_1$.

Likewise, the orientation of an elementary resonator of the second array, the centre of which is located at a point $P_j$ having the coordinates $(x_j, y_j)$ in the reference frame $(O, x, y)$ is chosen in such a way as to introduce a phase shift of $$\varphi_{2,j} = \frac{2\pi n_o^2}{\lambda_2}\left(f - \sqrt{(x_j - x_2)^2 + (y_j - y_2)^2 + f^2}\right) \text{ with } |\varphi_{2,j}| < \frac{\pi}{2}$$

where $n_o^2$ is the optical index of the output medium at the wavelength $\lambda_2$.

Figure 7:
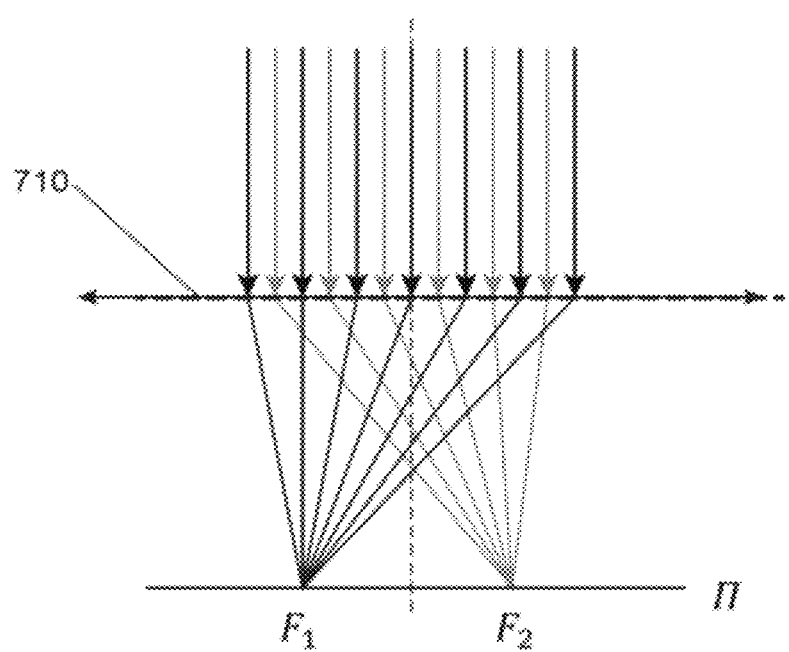
FIG. 7 schematically shows the use of a lens with a metasurface in order to carry out spectral sorting.

FIG. 7 schematically shows the use of a lens with a metasurface in order to carry out spectral sorting in polarised light.

The lens with a metasurface, designated by 710, is structured to comprise two arrays of elementary resonators as described in relation to FIG. 6. The focal points are designated by $F_1$ and $F_2$. An incident wave arriving on the lens according to the direction of the optical axis is focused at the point $F_1$ with regard to its component at the wavelength $\lambda_1$ and at the point $F_2$ with regard to its component at the wavelength $\lambda_2$.

Figure 8:
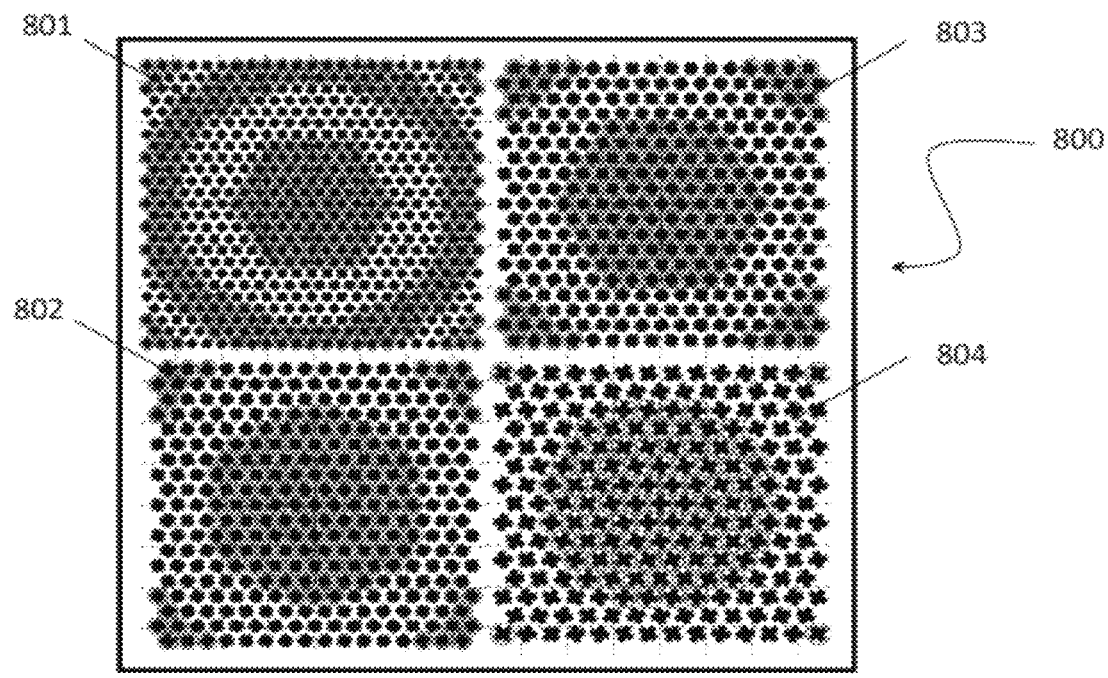
FIG. 8 schematically shows the use of lenses with a metasurface in order to carry out four-colour imaging.

It is thus possible to sort the two spectral components of the incident wave at the points $F_1$ and $F_2$. A person skilled in the art will understand that this spectral sorting can be generalised without difficulty to more than 2 wavelengths by structuring the lens with a metasurface into as many arrays of resonators as wavelengths to be sorted FIG. 8 schematically shows the use of lenses with a metasurface in order to carry out four-colour imaging.

More precisely, this figure shows a pixel 800, divided into four elementary sub-pixels, each elementary sub-pixel 801-804 being associated with a lens with a metasurface, the resonators of which are centred on a particular wavelength.

In the present case, the lenses associated with the elementary sub-pixels 801-804 are respectively set to the wavelengths 2 µm, 3.3 µm, 3.7 µm and 4.5 µm. The size of the pixel is 30 µm×30 µm and that of the elementary sub-pixels is 15 µm×15 µm. The index of the output medium (substrate made of CdTe) is 2.7 and the index of the material filling the arms of the crosses is 2.2 (SiN or ZnS). The focal distance here is 30 µm.

The lenses with a metasurface associated with the elementary sub-pixels 801-804 have the structure described in relation to FIGS. 3C and 4.

It is understood that each lens with a metasurface associated with a sub-pixel carries out both a function of focusing and of filtering, the intensity of the incident beam being measured at four wavelengths of interest at four focal points located in the same plane.

Using, for the same lens, crosses having the same size but different orientations allows to obtain filtering with better spectral selectivity than in the prior art (cf. aforementioned article by X. M. Goh). In other words, the responses of the various lenses are well separated in terms of wavelength.

Figure 9:
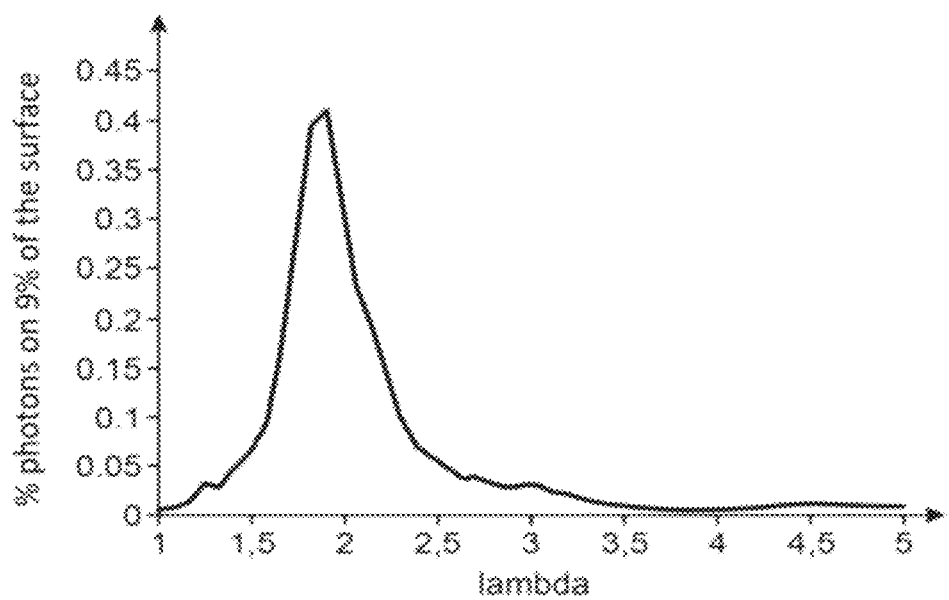
FIG. 9 shows the percentage of photons falling on a portion of the focal plane according to the wavelength for one of the lenses with a metasurface of FIG. 8.

FIG. 9 shows the percentage of photons falling on a portion of the focal plane according to the wavelength for the lens with a metasurface of FIG. 8 associated with the wavelength of 2 µm.

The portion of the focal plane considered is taken here to be equal to 9% of the surface of the lens in question. It is observed that the lens has good spectral selectivity around the central wavelength of the resonators, namely 2 µm. The wavelengths 3.3 µm, 3.7 µm and 4.5 µm corresponding to the other elementary sub-pixels are well filtered.

The invention claimed is:

1. A lens with a metasurface intended to receive an incident wave of a given wavelength, the lens comprising:
at least one first array of resonators, said resonators of the first array being crosses having identical shapes, said first array being located in a plane of the lens, each cross comprising at least one first arm, called long arm, extending along a first axis and a second arm, called short arm, having a length strictly less than the long arm and extending along a second axis, substantially orthogonal to the first axis, each cross phase shifting the incident wave by introducing a specific phase shift ($\varphi_i$) depending on the orientation of the cross ($\psi_i$) with respect to a reference direction in the plane of the lens, the crosses of the first array not having one single orientation.

2. The lens with a metasurface according to claim 1, wherein the length of the long arm is greater than the length of the short arm by 5% to 10%.

3. The lens with a metasurface according to claim 1, wherein the lengths of the long and short arm are chosen in such a way that the difference between the resonance frequency of the long arm and the resonance frequency of the short arm is less than the width at half height of the transmission spectral response of each of said arms.

4. The lens with a metasurface according to claim 1, wherein the crosses are made by apertures in a metal layer, the metal layer being deposited on a first dielectric layer transparent to said given wavelength.

5. The lens with a metasurface according to claim 4, wherein the apertures are filled by a material having an optical index greater than the optical index of the first dielectric layer.

6. The lens with a metasurface according to claim 4, wherein the first dielectric layer is itself deposited on a semiconductor substrate transparent to said given wavelength, the optical index of the substrate being greater than the index of the first dielectric layer.

7. The lens with a metasurface according to claim 4, wherein a second dielectric layer is deposited on the metal layer, said second dielectric layer being made from the same material as the first dielectric layer and having a thickness of $$\frac{\lambda}{2n}$$

where $\lambda$ is said given wavelength and n is the index of the first and second dielectric layer.

8. The lens with a metasurface according to claim 4, wherein the lens with a metasurface is a convergent lens, having a focal distance f, and the orientation of a cross, the centre of which is located at a point $P_i$ having the coordinates $(x_i, y_i)$ in a reference frame $(O, x, y)$ in the plane of the lens, is chosen in such a way as to generate a specific phase shift $$\varphi_i = \frac{2\pi n_o}{\lambda}\left(f - \sqrt{x_i^2 + y_i^2 + f^2}\right) \text{ with } |\varphi_i| < \frac{\pi}{2}$$

where $\lambda$ is said given wavelength and $n_o$ is the index of the output medium of the lens.

9. The lens with a metasurface according to claim 7, wherein the lens with a metasurface is a convergent lens, having a focal distance f, and the orientation of a cross, the centre of which is located at a point $P_i$ having the coordinates $(x_i, y_i)$ in a reference frame $(O, x, y)$ in the plane of the lens, is chosen in such a way as to generate a specific phase shift $$\varphi_i = \phi_i \bmod \frac{\pi}{2} \text{ with } \phi_i = \frac{2\pi n_o}{\lambda}\left(f - \sqrt{x_i^2 + y_i^2 + f^2}\right),$$

where $n_o$ is the index of the output medium of the lens, a third dielectric layer having a thickness of $$\frac{\lambda}{2n}$$

being deposited only above the crosses for which $$\frac{\pi}{2} < |\phi|_i < \pi.$$

10. The lens with a metasurface according to claim 1, wherein the orientation of the crosses can only take on a finite set of discrete angular values.

11. The lens with a metasurface according to claim 1, wherein the first array is periodic.

12. The lens with a metasurface according to claim 4, further comprising a second array of resonators, the resonators of the second array being crosses having identical shapes, the second array being located in the plane of the lens, each cross of the second array being further located in an effective cross-section having a size of $$\left(\frac{\lambda}{2}\right)^2$$

of a cross of the first array, the crosses of the second array having a size smaller than that of the crosses of the first array, each cross of the second array also comprising a long arm and a short arm, each cross of the second array phase shifting the incident wave by a specific phase shift depending on its orientation, in the plane of the lens, with respect to said reference direction.

13. The lens with a metasurface according to claim 12, wherein the incident wave comprises a first spectral component at a first wavelength $\lambda_1$ and a second spectral component at a second wavelength $\lambda_2$ the lens with a metasurface is a convergent lens, having a focal distance f, the orientation of a cross of the first array, the centre of which is located at a point $P_i$ having the coordinates $(x_i, y_i)$ in a reference frame $(O, x, y)$ of the plane of the lens, is chosen in such a way as to generate a specific phase shift $$\varphi_{1,i} = \frac{2\pi n_o^1}{\lambda_1}\left(f - \sqrt{(x_i - x_1)^2 + (y_i - y_1)^2 + f^2}\right) \text{ with } |\varphi_{1,i}| < \frac{\pi}{2}$$

where $n_o^1$ is the optical index of the output medium of the lens, at the wavelength $\lambda_1$, and the orientation of a cross of the second array, the centre of which is located at a point $P_j$ having the coordinates $(x_j, y_j)$ in the reference frame $(O, x, y)$, is chosen in such a way as to generate a specific phase shift $$\varphi_{2,j} = \frac{2\pi n_o^2}{\lambda_2}\left(f - \sqrt{(x_j - x_2)^2 + (y_j - y_2)^2 + f^2}\right) \text{ with } |\varphi_{2,j}| < \frac{\pi}{2}$$

where $n_o^2$ is the optical index of the output medium of the lens, at the wavelength $\mu_2$.

* * * * *